(12) United States Patent
Pineschi

(10) Patent No.: US 7,950,107 B2
(45) Date of Patent: May 31, 2011

(54) PORTABLE HOUSEHOLD APPLIANCE

(75) Inventor: Massimiliano Pineschi, Villanova (IT)

(73) Assignee: Kostec SA, Chiasso (CH)

( * ) Notice: Subject to any disclaimer, the term of this patent is extended or adjusted under 35 U.S.C. 154(b) by 295 days.

(21) Appl. No.: 12/085,320

(22) PCT Filed: Nov. 16, 2006

(86) PCT No.: PCT/IB2006/003230
§ 371 (c)(1), (2), (4) Date: May 21, 2008

(87) PCT Pub. No.: WO2007/063377
PCT Pub. Date: Jun. 7, 2007

(65) Prior Publication Data
US 2009/0151114 A1    Jun. 18, 2009

(30) Foreign Application Priority Data

Nov. 29, 2005   (IT) .............................. MO2005A0321

(51) Int. Cl.
A47L 9/28    (2006.01)
(52) U.S. Cl. .......................................... 15/412; 15/319
(58) Field of Classification Search ............... 15/412, 15/319, 339
See application file for complete search history.

(56) References Cited

U.S. PATENT DOCUMENTS

| | | | |
|---|---|---|---|
| 3,695,006 A | 10/1972 | Valbona et al. | |
| 4,005,502 A * | 2/1977 | Stevens (Boyer) | 15/22.1 |
| 4,731,898 A | 3/1988 | Sovis et al. | |
| 4,969,229 A * | 11/1990 | Svanberg et al. | 15/339 |
| 5,072,484 A | 12/1991 | Edlund | |
| 5,787,545 A * | 8/1998 | Colens | 15/319 |
| 5,926,909 A * | 7/1999 | McGee | 15/339 |
| 6,526,622 B2 * | 3/2003 | Conrad | 15/319 |
| 2002/0153185 A1 | 10/2002 | Song et al. | |
| 2006/0076035 A1 * | 4/2006 | McGee et al. | 134/6 |

FOREIGN PATENT DOCUMENTS

| | | |
|---|---|---|
| EP | 0 370 610 | 5/1990 |
| EP | 1 260 170 | 11/2002 |
| WO | 89/11816 | 12/1989 |
| WO | 00/77918 | 12/2000 |

OTHER PUBLICATIONS

International Search Report for PCT/IB2006/003230 dated Apr. 9, 2007.

* cited by examiner

*Primary Examiner* — Dung Van Nguyen
(74) *Attorney, Agent, or Firm* — Nixon & Vanderhye, P.C.

(57) ABSTRACT

The portable household appliance comprises: a motor unit (3) arranged to operate at least at lower operating speeds (M) or at higher speeds (MD, MX) and vice versa; first power supply means (9) arranged to constantly supply said motor unit (3); control means for increasing said lower speeds (M) in a first time interval (T1) up to said higher speeds (MD, MX) or to reduce said higher speeds (MD, MX) in a second time interval (T2) up to said lower speeds (M); auxiliary means (10) for the temporary power supply of said motor unit (3) which can be actuated during said first time interval (T1).

12 Claims, 3 Drawing Sheets

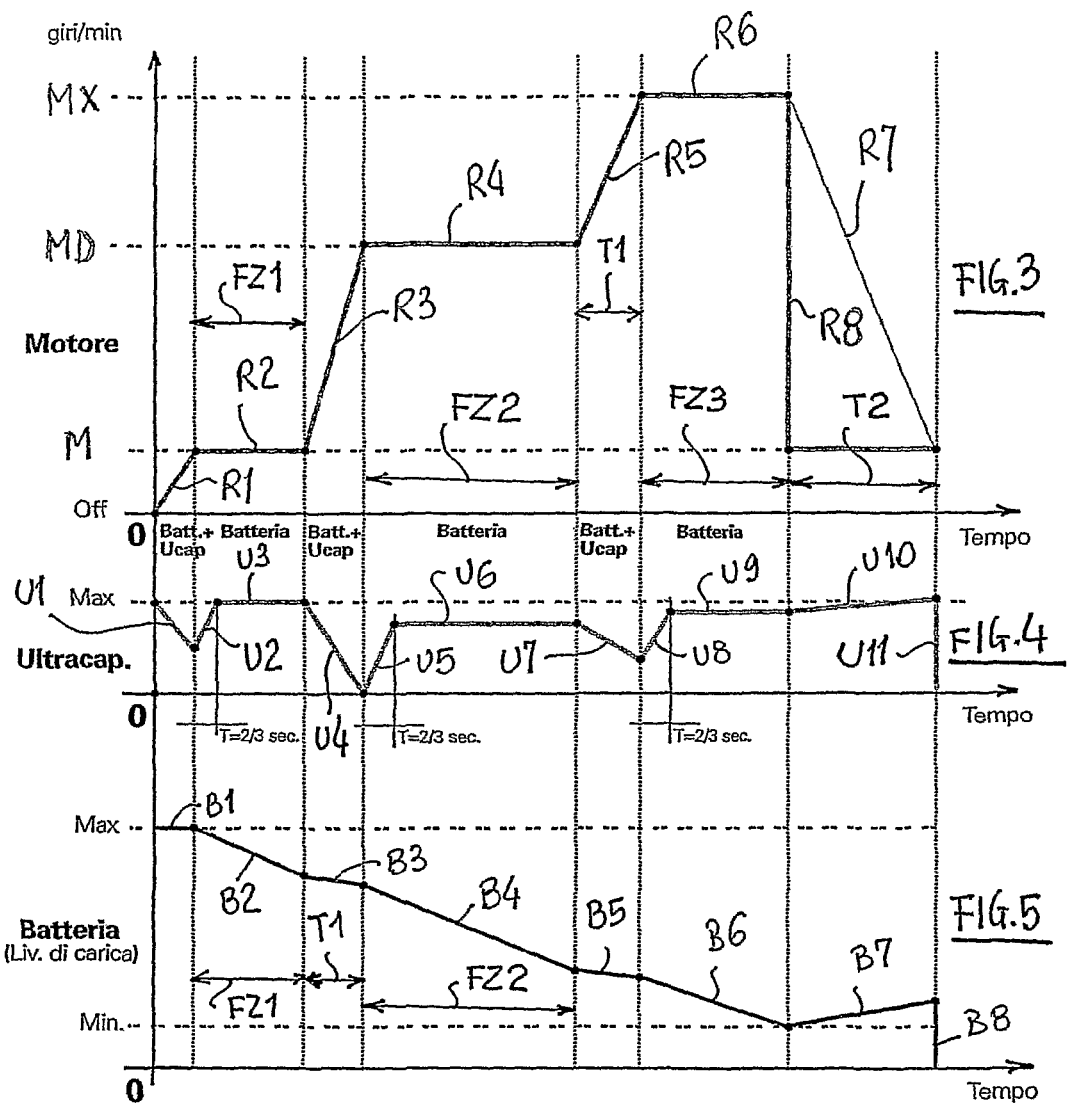

PORTABLE HOUSEHOLD APPLIANCE

This application is the U.S. national phase of International Application No. PCT/IB2006/003230 filed 16 Nov. 2006 which designated the U.S. and claims priority to Italian Application No. MO2005A000321 filed 29 Nov. 2005, the entire contents of each of which are hereby incorporated by reference.

TECHNICAL FIELD

The invention refers to a portable household appliance of the type without power cable.

TECHNOLOGICAL BACKGROUND

For some time now, many household appliances have been used and operate without being directly connected to an electric power source, such as, for instance, a conventional domestic electric power mains supply.

These household appliances, such as, for instance, vacuum cleaners, are technically called "cordless" household appliances.

In the specific case of vacuum cleaners, these essentially are composed of a casing inside which a motor is fitted that drives a fan that generates a vacuum, together with a filter for separating the impurities from the air sucked up by the fan and a set of batteries, normally of the rechargeable type, connected to the motor to drive it. When it is not used, or when the set of batteries is down, the vacuum cleaner is connected, by means of a specific cable, to a standard electric power mains socket, for instance an industrial or domestic mains supply, which recharges the set of batteries. When on the other hand, the vacuum cleaner is used, the domestic mains supply connection cable is disconnected to make it portable everywhere and the motor is driven by the set of batteries only.

Consequently, as long as the set of batteries has enough charge, the motor drives the fan which in turn generates vacuum, while when the charge is down, the motor stops driving the fan and the vacuum cleaner cannot be used until the batteries are recharged.

The set of batteries is often of the changeable type and, for this reason, users, to prevent the vacuum cleaner from stopping work before a cleaning cycle is over, purchase at least another set of spare batteries which is recharged by placing in a specific recharging apparatus connected to the power mains, while the first set is being used in the vacuum cleaner. This way, when the first set of batteries is down, this is removed from the vacuum cleaner and placed on the recharging apparatus and is substituted in the vacuum cleaner with the second charged set and the vacuum operation can be prolonged in time.

This state of the art does however have some drawbacks.

A first drawback is that the battery charge has a duration limited in time, above all in the event of the vacuum cleaner operation requiring high motor powers and, consequently, motor operation that is always close to top rotation speed.

Another drawback is that users, so as not to have to interrupt use of the vacuum cleaner when a set of batteries is down, have to purchase, and keep at disposal, as has already been said, at least a second set of spare batteries to be recharged while the first set is being used, and vice versa.

Another drawback is that when the sets of batteries are no longer rechargeable and have to be replaced with other new ones because they have terminated their life cycle, these must be disposed of by depositing at places specifically dedicated to this purpose. Such disposal prevents, the pollution that would ensue if they were disposed of in places commonly set aside for the collection of domestic waste or, even worse, if they were abandoned in fields or thrown into water courses.

Another drawback is that the sets of batteries must have high charge capacities, which results in heavy weights and costs and requires long charging times that vary between three and five hours, during which time the portable household appliance is not usable.

Another drawback is that many types of battery sets cannot be completely recharged because, due to the material used to make them, these maintain a so-called "memory effect", meaning that when they are no longer able to power the motor adequately, they are not completely discharged and maintain an albeit residual charge level which is not however usable.

When these sets of batteries undergo subsequent recharging, this only restores the difference in charge between the residual level and the maximum level. The upshot of this is that the duration of the usable charge is significantly reduced with respect to the real capacity of the battery sets.

The technical aim of the technology disclosed herein is to upgrade the state of the art.

An object of the technology disclosed herein is to make a portable household appliance, of the type without power cable, that has operating times considerably higher than those of a known portable household appliance.

Another object of the technology disclosed herein is to make a portable household appliance, of the type without power cable, that requires reduced recharge times.

Another object of the technology disclosed herein is to make a portable household appliance, of the type without power cable, that permits reducing the dimensions of power battery sets, maintaining performance levels substantially unchanged with respect to those of a known portable household appliance.

Another object of the technology disclosed herein is to make a portable household appliance, of the type without power cable that permits completing its operating function by recharging a motor power supply unit in a very short time, meaning in just a few seconds.

SUMMARY

According to one aspect of the technology disclosed herein, a portable household appliance is provided envisaged comprising: a motor unit arranged to operate at least at lower operating speeds or at higher speeds and vice versa; first power supply means designed to constantly supply such motor means; control means for increasing said lower speeds in a first time interval up to said higher speeds or to reduce said higher speeds in a second time interval up to said lower speeds, characterized in that it comprises auxiliary means for the temporary power supply of said motor unit which can be actuated during said first time interval.

BRIEF DESCRIPTION OF THE DRAWINGS

Further characteristics and advantages will appear even more evident from the description of an embodiment of a portable household appliance without power cable, illustrated indicatively by way of non limiting example, in the attached drawing wherein:

FIG. 3 is a quality diagram of the pattern of three possible operating speeds of the motor unit in FIG. 2 in which the Y-axis shows the number of rpm of the motor unit and the x-axis shows the operating time;

FIG. 4 is a quality diagram of the charge conditions of the auxiliary power supply means in FIG. 2 in which the Y-axis shows the charge levels of auxiliary power supply means and the X-axis shows their charging and discharging times.

FIG. 5 is a quality diagram of the charge conditions of the battery means in FIG. 2 in which the Y-axis shows the charge levels of battery means and the X-axis shows their discharging times.

DETAILED DESCRIPTION

Figure 1:
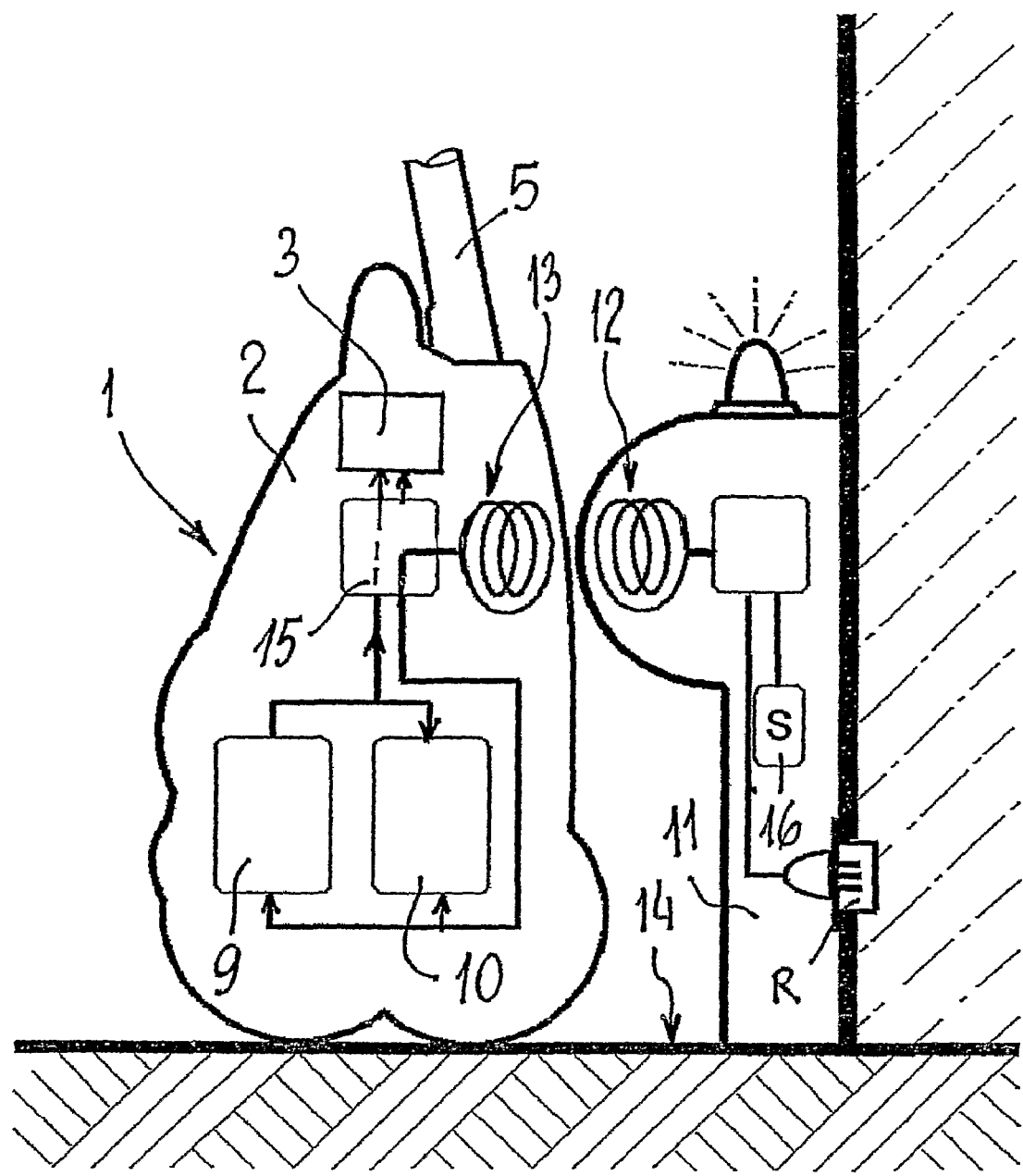
FIG. 1 is a very schematic and transparent view of a portable vacuum cleaner without a power cable.
Figure 2:
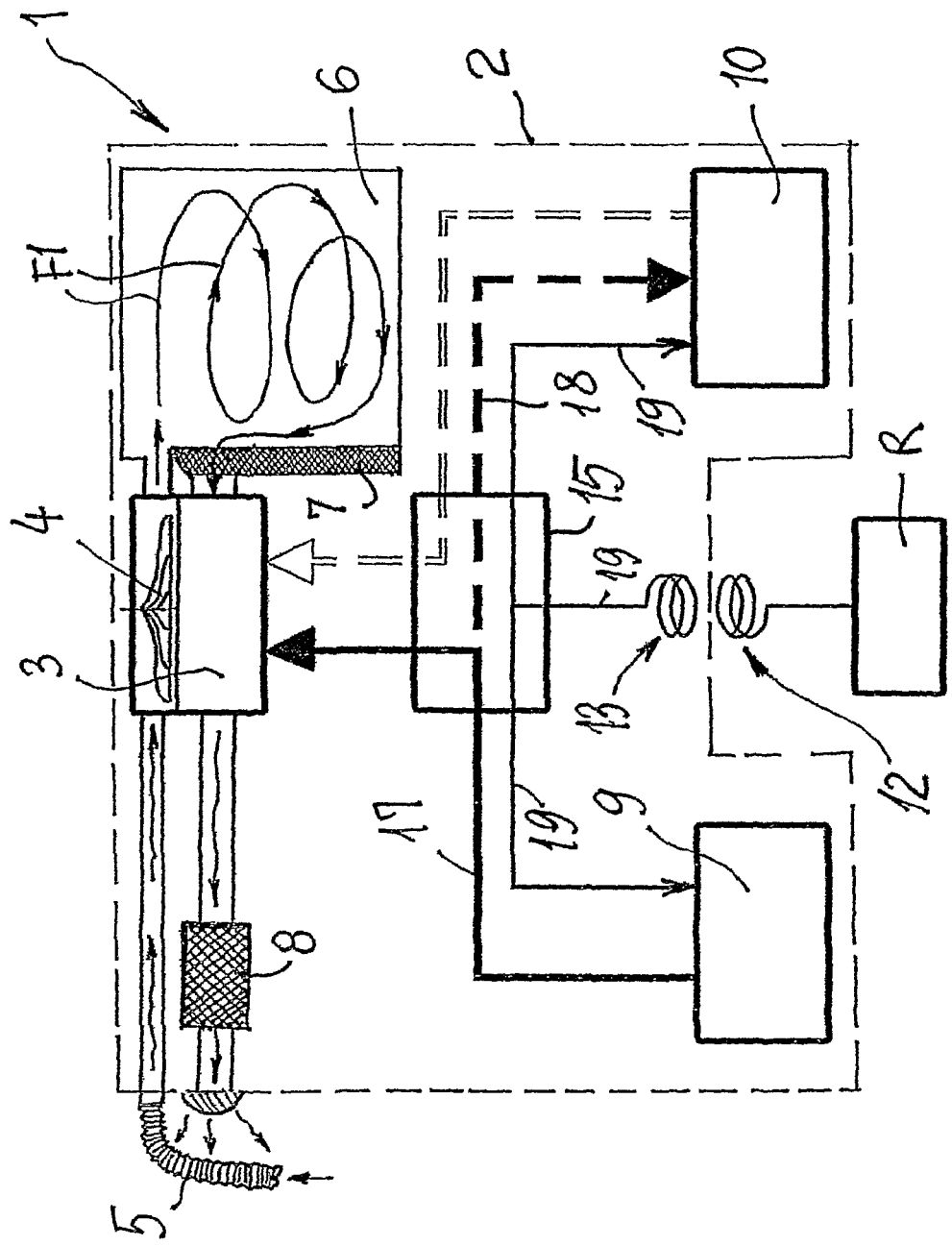
FIG. 2 is a block diagram of a connection between a motor unit, battery means and auxiliary power supply means of the vacuum cleaner in FIG. 1.

With special reference to the FIG. 1 and FIG. 2, a portable household appliance without power cable, has been schematically designated by reference number 1.

The vacuum cleaner 1 comprises an external casing 2 which contains, inside it, a motor unit 3 that drives a fan 4 rotatably, so as to create air suction from outside through a suction pipe 5.

The suctioned air enters a chamber 6, wherein it grows into rotary flows, as indicated by the arrows F1, so the debris in the suctioned air is released by centrifugal or gravity force and collected up on the bottom of the chamber 6.

The air then passes through a first filter 7 and laps the motor unit 3 to cool it; it is then conveyed outside after passing through a second filter 8.

The motor unit 3 is constantly supplied by a rechargeable battery 9; besides this battery 9, a set of ultra-capacitors 10 is also fitted that represent auxiliary means 11 for supplying the motor unit 3 and which can be actuated for time intervals, as described below.

Through an electric power connection line 17, the battery 9 supplies the motor unit 3 and, through a second electric power connection line 18, also the ultra-capacitors 10 when these are not used, to keep them charged and ready to provide power whenever this is required.

As is known, the ultra-capacitors 10 are power accumulators that discharge at very limited time intervals and provide most of the stored power, and which recharge in an equally limited amount of time, meaning in just a few seconds; these ultra-capacitors are made, for example, by the US company Maxwell Technologies Inc. and have different charge capacities for each type of use.

The battery 9 can be recharged by means of a normal electric power mains, such as, for example, a domestic or industrial power mains, indicated by "R".

According to the technology disclosed herein, and with reference to the FIGS. 1 and 2, it can be observed that the recharge of both the battery 9 and the ultra-capacitors 10 is by induction, by means of a base 11 which is connected to an electric power point and which has a transmitter unit 12 that produces magnetic waves and which is started or stopped by means of the first electronic means, for example a programmable electronic board 16.

The vacuum cleaner 1 also comprises, inside the casing 2, a receiver unit 13, arranged to receive the recharge electric waves transmitted by the transmitter unit 12 and send these to the battery 9 and to the ultra-capacitors 10, through a third electric power line 19, when the vacuum cleaner 1 is positioned on the base 11, and specifically in a placement seat 14 obtained in the latter, shaped so that, in a recharge position of the vacuum cleaner 1, the transmitter unit 12 and the receiver unit 13 are mutually positioned in relation to one another.

The battery 9, when charged, supplies the motor unit 3 in a substantially constant way during the latter's operation.

The motor unit 3 can run at different operating speeds which, in the case shown in FIGS. 3, 4, 5, are, for example, three in total, i.e. a minimum speed "M", a medium speed "MD", and a top speed "MX".

Naturally, the number of operating speeds can also be restricted to two or be more than three.

The user can select the most suitable speed for his/her operating requirements using the conventional control located, for example, on the vacuum cleaner 1.

Every time the user changes the operating speed of the motor unit 3, and increases this, besides the constant power supplied by the battery 9, an auxiliary supply is provided actuated by a programmed electronic board 15 that actuates the ultra-capacitors 10 so these supply the motor unit 3 for a first time interval T1 needed to switch from a lower operating speed, for example a minimum speed "M" to a higher operating speed, for example a medium speed "MD", or also from a medium speed "MD" to a top speed "MX".

More in detail, with reference to FIG. 3, the tilted segment R1 indicates an ignition phase of the motor unit 3, which switches from zero operating speed, to minimum operating speed, indicated on the Y-axis by the letter "M".

During this switch, the motor unit is supplied jointly both by the battery 9 and by the ultra-capacitors 10 actuated by the electronic board 15, which as it is shown on the corresponding diagram of FIG. 4, undergo a quick reduction in overall possessed charge, as qualitatively indicated by the tilted segment U1, until they are disengaged by the electronic board 15 and their power supply is interrupted, when the motor unit 3 has reached the minimum operating speed "M".

Again with reference to the diagram in FIG. 3, the horizontal segment R2 shows a minimum operating speed condition of the motor unit 3 for a time interval FZ1 set by the user, who uses the vacuum cleaner 1 at this operating speed.

During this time interval FZ1, the ultra-capacitors 10 are quickly recharged by the battery 9, as indicated by segment U2 in the diagram of FIG. 4, through the further electric power line 17, and then kept charged as indicated by horizontal segment U3 of the same FIG. 4 for the entire time interval FZ1.

During this phase, the battery 9 gradually loses a quantity of its charge, as indicated in the diagram of FIG. 5 by segments B1 and B2, due to the continual use by the user of the vacuum cleaner 1.

When the user requires a higher operating speed of the motor unit 3, i.e. an increase in the suction force of the vacuum cleaner 1, he/she operates a special control provided for the purpose on the vacuum cleaner 1, and not shown inasmuch known to the technician skilled in the field.

The electronic board 15 receives the user's request and actuates the ultra-capacitors 10 for a first time interval T1 so as to supply the motor unit 3 together with the battery 9 during this time interval required by the motor unit 3 to switch from the minimum operating speed "M" to a higher operating speed, for example, medium speed indicated by "MD" on the diagram of FIG. 3.

When this medium operating speed "MD" is reached, as shown on the diagram of FIG. 3 by the inclined segment "R3", the electronic board 15 disengages the ultra-capacitors 10 which, meanwhile, have again undergone a drop in charge, as shown on the diagram of FIG. 4 by segment U4; the battery 9 also undergoes a further drop in charge as shown by segment B3 on the diagram of FIG. 5.

The user can maintain the medium operating speed for a time interval indicated by "FZ2" in FIGS. 3, 4, 5: in detail, this condition is shown by horizontal segment R4 on the diagram of FIG. 3, during which the battery 9 undergoes a further drop in charge indicated by segment B4 in FIG. 5, while the ultra-capacitors 10 are quickly recharged by the battery 9 in a time interval of about ⅔ seconds, as indicated by the segment U5 of FIG. 4, even though they do not reach maximum charge level.

If the user requires a further increase in the operating speed of the motor unit 3 up to a maximum speed, indicated in the diagram of FIG. 3 by "MX", the electronic board 15 again actuates the ultra-capacitors 10 for a further first time interval T1, and keeps these actuated until the motor unit 3 has reached the maximum required operating speed "MX".

This increase in operating speed is indicated in the diagram of FIG. 3 by the segment R5, while by the segment R6 is indicated a subsequent constant operating speed of the motor unit 3 at maximum power.

In the ultra-capacitors 10 and in the battery 8, the same conditions occur, qualitatively indicated previously, for switching from a minimum operating speed "M" to a medium operating speed "MD", i.e., again with reference to the diagram of FIG. 4, it can be observed that the ultra-capacitors 10 at constant operating speed R4 maintain their charge, as indicated by segment U6 while, at the subsequent further first time interval T1, they undergo a quick reduction in charge, qualitatively indicated by segment U7, being actuated by the electronic board 15 to supply the motor unit 3 during the change in operating speed.

The battery 9, in these conditions, continues to undergo a drop in overall charge, indicated by segments B5 and B6 respectively.

When the user stops using the vacuum cleaner 1 and, by means of the control, again switches the operating speed of the motor unit 3 to minimum speed "M", the magnetic board 15 switches the operation of the motor unit 3 so the inertia this possesses due to the operating speed, is converted, during the switch to a lower operating speed, into energy used to recharge, during a second short time interval T2, at least the ultra-capacitors 10 to allow an albeit short extension of the operation of the motor unit 3 at a lower speed, extend the operation of the vacuum cleaner 1 and complete the vacuum operation to be performed.

Practically speaking, in the diagram of FIG. 3, the segment R7 indicates the gradual reduction in the operation speed of the vacuum cleaner during a second time interval T2, while the vertical segment R8 indicates that as soon as the user uses the control to reduce the operating speed of the motor unit 3, this no longer absorbs power, but on the contrary, generates it.

The ultra-capacitors 10 are recharged during a third operation time interval FZ3, as shown by segment U8 in the diagram of FIG. 4 and maintain the charge level reached, as shown by the next horizontal segment U9.

When the motor unit 3 switches to power generator in the second time interval T2, the ultra-capacitors 10 are recharged by this in a substantially complete way, as indicated by segment U10 and make it possible to continue operating the motor unit 3 for some tens of seconds more.

As the diagram in FIG. 5 shows, during the same second time interval T2 the battery 9 also receives a small charge increase, shown by the segment B7.

When both the ultra-capacitors 10 and the battery 9 are down, a condition indicated by the segments U11 in FIG. 4 and B8 in FIG. 5 respectively, the user positions the vacuum cleaner 1 in the housing 14 of the base 11 and, by means of the transmitter unit 12 and the receiver unit 13, both the battery 9 and the ultra-capacitors 10 are recharged.

It should be noted that the charge times of the ultra-capacitors 10 are very short, just a few seconds, and the user can also decide to recharge, according to a quick charging condition, only the latter by placing the vacuum cleaner 1 on the base 11 and removing this off the base once the ultra-capacitors 10 are fully recharged; this way, the user can continue using the vacuum cleaner 1 for a short time, but without having to wait for the battery 9 to also fully recharge.

The user can repeat this quick recharge condition several times to prolong the operation of the vacuum cleaner 1 only by means of the ultra-capacitors 10.

The use of the latter therefore not only makes it possible to extend the operating time of the vacuum cleaner 1, or any other portable household appliance on which they can be fitted together with a battery 9, but also to reduce the capacity of the battery 9, and therefore the weight and the cost of the latter, because during the switch from lower to higher operating speed, the increase in the power supply required to increase these rotating speeds is provided by the ultra-capacitors 10 which add their power, for a time interval controlled by the electronic board 15, to the constant power supply provided by the battery 9.

The invention claimed is:

1. A portable household appliance comprising:
 a motor unit arranged to operate at least at a lower operating speeds or at a higher speeds and vice versa;
 a first power supply designed to constantly supply said motor unit;
 a controller which is configured
  in a first time interval, to increase said lower operating speeds up to said higher speeds or
  in a second time interval, to reduce said higher speeds up to said lower operating speed;
 an auxiliary power supply of said motor unit configured to be actuated during said first time interval;
 wherein said motor unit is arranged to recharge at least said auxiliary power supply in said second time interval;
 wherein said controller is also arranged to switch said motor unit to a recharge generator unit so to recharge said auxiliary power supply in said second time interval; and
 wherein said auxiliary power supply comprises at least one ultra-capacitor.

2. A portable household appliance according to claim 1, wherein said first power supply comprises a battery.

3. A portable household appliance according to claim 2, wherein said battery is of the rechargeable type by a power recharger.

4. A portable household appliance according to claim 3, wherein said power recharger comprises an inductive recharger.

5. A portable household appliance according to claim 4, wherein said inductive recharger comprises:
 a base configured to shapes a placement seat of said household appliance under a recharge condition of said battery and/or of said auxiliary power supply;
 a recharge power transmitter, housed in said base and which can be connected to a conventional electric energy mains supply;
 a first electronic device arranged to automatically actuate said recharge power transmitter when said household appliance is positioned in said placement seat;
 a recharge receiver housed in said portable household appliance and connected to said battery and said auxiliary power supply.

6. A portable household appliance according to claim 5, wherein said placement seat is shaped to receive said household appliance in a pre-established position so that said transmitter and said recharger receiver are facing each other.

7. A portable household appliance according to claim 5, wherein said at least one ultra-capacitor is rechargeable one or more times with said base and separately from said battery.

8. A portable household appliance according to claim 5, wherein said first electronic device comprises a programmable electronic board.

9. A portable household appliance according to claim 1, wherein said at least one ultra-capacitor is connected to said motor unit and said first power supply through connection circuits.

10. A portable household appliance according to claim 1, wherein said controller is provided to be placed between said at least one ultra-capacitor and said first power supply and arranged to actuate and/or stop said at least one ultra-capacitor in each said first time interval.

11. A portable household appliance according to claim 1, wherein said at least one ultra-capacitor is suitable to supply said motor unit separately from said first power supply.

12. A portable household appliance according to claim 1, wherein said portable household appliance comprises a vacuum cleaner.

* * * * *